(12) United States Patent
Schlimgen et al.

(10) Patent No.: US 11,751,508 B2
(45) Date of Patent: Sep. 12, 2023

(54) CONVERTIBLE LEFT UNLOAD AND RIGHT UNLOAD AUGER SYSTEM FOR A FARM IMPLEMENT

(71) Applicant: Unverferth Manufacturing Co., Inc., Kalida, OH (US)

(72) Inventors: Ronald J. Schlimgen, Shell Rock, IA (US); August Paul Nelson, Hampton, IA (US)

(73) Assignee: UNVERFERTH MANUFACTURING COMPANY, INC., Kalida, OH (US)

( * ) Notice: Subject to any disclaimer, the term of this patent is extended or adjusted under 35 U.S.C. 154(b) by 0 days.

(21) Appl. No.: 17/482,099

(22) Filed: Sep. 22, 2021

(65) Prior Publication Data

US 2023/0093038 A1    Mar. 23, 2023

(51) Int. Cl.
*A01D 90/10*  (2006.01)
*B60P 1/42*  (2006.01)

(52) U.S. Cl.
CPC ............... *A01D 90/10* (2013.01); *B60P 1/42* (2013.01)

(58) Field of Classification Search
CPC .................................. A01D 90/10; B60P 1/42
See application file for complete search history.

(56) References Cited

U.S. PATENT DOCUMENTS

| | | |
|---|---|---|
| 2,438,301 A | 3/1948 | Schulte |
| 2,960,320 A | 11/1960 | Heider |
| 3,098,555 A * | 7/1963 | Harriott ................ B60P 1/60 414/505 |
| 3,717,272 A * | 2/1973 | Chartier ................ B60P 1/40 198/313 |
| 4,411,581 A * | 10/1983 | Niewold ................ B60P 1/40 222/536 |
| 5,468,113 A | 11/1995 | Davis |
| 10,071,669 B2 | 9/2018 | Kinzenbaw |
| 10,160,367 B2 | 12/2018 | Van Mill |
| 10,743,474 B1 * | 8/2020 | Schlimgen ............ B65G 33/14 |

(Continued)

OTHER PUBLICATIONS

"2018 Elmers Haul Master 2000 for sale in Rosenort, Manitoba Canada," Rosenort Motors Ltd., https://www.tractorhouse.com/listings/farm-equipment/for-sale/29651333/2018-elmers-haul-master-2000?print=1, 2018, 1 page.

(Continued)

*Primary Examiner* — Kaitlin S Joerger
(74) *Attorney, Agent, or Firm* — Rothwell, Figg, Ernst & Manbeck, P.C.

(57) ABSTRACT

A farm implement includes a frame, a container mounted on the frame, an intake housing rotatably connected to a front wall of the container proximate to a discharge opening, a first auger assembly, and a second auger assembly. The first auger assembly is disposed in the container and conveys agricultural material through the discharge opening. The farm implement further includes a first mounting assembly and a second mounting assembly disposed along the front wall. The second auger assembly is mounted on one of the first and second mounting assemblies at an operating position, without being mounted to the other one of the first and second mounting assemblies. The longitudinal axis of the first auger assembly is above a part of the second auger assembly in both of the first and second mounting configurations.

10 Claims, 6 Drawing Sheets

(56) References Cited

U.S. PATENT DOCUMENTS

| | | | |
|---|---|---|---|
| 10,743,475 B2 | 8/2020 | Friesen | |
| 11,019,771 B2* | 6/2021 | Schlimgen | B65G 67/24 |
| 2010/0209223 A1* | 8/2010 | Van Mill | B65G 67/24 |
| | | | 414/526 |
| 2011/0164952 A1* | 7/2011 | Hollenberg | B60P 1/42 |
| | | | 414/523 |
| 2015/0237804 A1* | 8/2015 | Van Mill | B60P 1/42 |
| | | | 414/523 |
| 2017/0055454 A1* | 3/2017 | Michael | B65G 33/32 |
| 2018/0242521 A1 | 8/2018 | Thomson et al. | |
| 2018/0244477 A1* | 8/2018 | Stilborn | B65G 41/002 |
| 2019/0000016 A1* | 1/2019 | Friesen | A01D 90/14 |

OTHER PUBLICATIONS

"2018 Elmers Haul Master 1300 for sale in Barnard, South Dakota," Ellwein Equipment, https://www.tractorhouse.com/listings/farm-equipment/for-sale/27653735/2018-elmers-haul-mast . . . , 2018, 1 page.
"Right-hand grain cart auger," Elmer's Manufacturing, https://elmersmfg.com/2017/12/right-hand-grain-cart-auger/, 2017, 4 page.
"1122 and 1322 grain carts," DEMCO, 2019 Harvest Equipment Specifications, 1 page.
"Grain carts 1122, 1322," demco-products.com, 2019, pp. 16-17.
"What makes the haulmaster grain cart great?" Elmer's Manufacturing, https://elmersmfg.com/haul-master-grain-cart/, 2019, 16 pages.

* cited by examiner

CONVERTIBLE LEFT UNLOAD AND RIGHT UNLOAD AUGER SYSTEM FOR A FARM IMPLEMENT

FIELD OF THE DISCLOSURE

This disclosure relates generally to farm implements, and more particular, to grain carts having an auger system that is capable of switching between a left-unload configuration and a right-unload configuration.

BACKGROUND

Carts, such as grain carts, can be used to shorten harvesting time by improving the efficiency of harvesting equipment such as combines. Such carts can, for example, be used to transport grain from harvesters or combines in the field to grain trucks or bins at the side of the field. Carts can be used to enable a combine to continue to harvest while unloading the grain into the cart. This grain unloading arrangement can increase productivity dramatically because combines typically do not stop to unload grain. In addition, when reaching full capacity, combines themselves typically do not need to travel to grain trucks or bins at the side of the field. After a cart is loaded with grain or other material by one or more combines, the grain is unloaded from the cart into a bin for temporary storage or into a waiting grain truck for transport to another location, such as a grain elevator.

Carts capable of unloading grain directly into a grain truck or bin often use a conveyor to do so. Often the conveyor is in the form of an auger. Various auger configurations are known. Auger structures can, for example, be contained inside the hopper, located entirely outside of the hopper, or positioned in another desired location. Auger configurations can, for example, have a single auger or multiple augers. The auger structure can, for example, be located at the front, side, back, corner, or another desired location of the cart.

A grain cart auger's typical discharge location is on the left-hand side of the unit. Because combine unload augers had extended to the left side and often did not fold or were difficult to fold, the grain cart's auger extended to the left-hand side to prevent the combine auger and the grain cart auger from making contact and causing damage when the combine unload auger unloads into the grain cart while the combine is harvesting. This typical left-hand unload configuration is still the predominant arrangement today, despite combine, tractors, and grain carts evolving to include unloading augers being easily foldable and/or movable, and thus decreasing the danger of unload auger contact.

Furthermore, the majority of controls for implement functions in the tractor, such as hydraulic controls and Power Take Off (PTO) are positioned right of the tractor driver seat. The combination of unload auger discharge position on the left-hand side and controls on the right-hand side can make for an unfriendly tractor operator condition. Newer tractors have seats that have limited swivel or rotation. Some tractor seats rotate only to the right, or rotate farther to the right than to the left. The implement controls right of the tractor operator and potential seat swivel to the right, makes for some desire for the auger discharge to be positioned on the right-hand (RH) side as it allows the opportunity for the tractor operator a better perspective of the unload auger discharge and grain cart function in an more comfortable arrangement.

SUMMARY

Accordingly, there is a need to provide improved grain carts that offers a single unload auger assembly capable of being assembled into either a LH or RH unload auger discharge location. Embodiments may be setup in either a LH or RH unload configuration while utilizing the same auger components for both the LR and RH unload configurations. Utilizing the same components for both the LH and RH unload configurations helps reduce factory and dealer inventory of service parts and carts with either auger configuration.

According to a first aspect, embodiments of a farm implement are provided. In some embodiments, the farm implement may include a frame. The farm implement may include a container mounted on the frame and configured to hold agricultural material, the container comprising a plurality of walls defining a container opening to receive agricultural material, and the plurality of walls including a front wall comprising a discharge opening to discharge agricultural material out of the container. The farm implement may include a first auger assembly disposed in the container and comprising a first auger shaft configured to rotate about a longitudinal axis thereof to move agricultural material received from the container opening toward the discharge opening. The farm implement may include an intake housing connected to the front wall proximate to the discharge opening, the intake housing comprising an inlet in communication with the discharge opening to receive agricultural material conveyed from the first auger assembly and an outlet to discharge agricultural material out of the intake housing. The farm implement may include a second auger assembly coupled to the outlet of the intake housing, the second auger assembly comprising an inlet at a first end to receive agricultural material from the outlet of the intake housing, an outlet at a second end to discharge agricultural material, and a second auger shaft configured to rotate about a longitudinal axis thereof to move agricultural material received from the inlet of the second auger assembly toward the outlet of the second auger assembly. The second auger assembly is mounted in one of a first mounting configuration and a second mounting configuration, and is configured to be mountable in the other of the first mounting configuration and the second mounting configuration. In the first mounting configuration, the second auger assembly is configured to discharge agricultural material at about a first side of the container when in a first operating position, and in the second mounting configuration, the second auger assembly is configured to discharge agricultural material at about a second side of the container opposite the first side of the container when in a second operating position. In each of the first and second operating positions, the longitudinal axis of the first auger shaft is in a substantially different plane than the longitudinal axis of the second auger shaft. The longitudinal axis of the first auger shaft is above a part of the second auger shaft in both of the first and second mounting configurations.

In some embodiments, in the first mounting configuration, the second auger assembly is configured to pivot with the intake housing to a first plurality of operating positions to discharge agricultural material, the first plurality of operating positions including the first operating position; and wherein, in the second mounting configuration, the second auger assembly is configured to pivot with the intake housing to a second plurality of operating positions to discharge agricultural material, the second plurality of operating positions including the second operating position. In some embodiments, the farm implement includes first and second slide rails mounted along the front wall, wherein the first and second slide rails are substantially symmetrical about a centerline of the front wall; and a rail follower connected to the second auger assembly and received in the first slide rail in the first mounting configuration and received in the second slide rail in the second mounting configuration, and the rail follower is configured to slide along the first or second slide rail as the second auger assembly pivots to at least one of the first or second plurality of operating positions.

In some embodiments, the farm implement includes a slide actuator removably coupled to the rail follower, wherein the slide actuator is configured to move the second auger assembly to the one or more of the first or second plurality of operating positions and wherein the slide actuator is connected to the front wall at the same position in both the first mounting configuration and the second mounting configuration. In some embodiments, the first and second slide rails are different from each other and do not overlap. In some embodiments, the longitudinal axis of the first auger shaft is above a part of auger flighting in the second auger shaft in both of the first and second mounting configurations. In some embodiments, the longitudinal axis of the second auger shaft is orthogonal to the longitudinal axis of the first auger shaft. In some embodiments, the longitudinal axis of the second auger shaft is angled forwardly with respect to the longitudinal axis of the first auger shaft. In some embodiments, a first set of mounting parts for mounting the first second auger shaft in the first mounting configuration is identical to a second set of mounting parts for mounting the second auger shaft in the second mounting configuration. In some embodiments, the intake housing connected to the front wall proximate to the discharge opening is rotatably connected thereto.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Although the terms horizontal and vertical are used here with respect to augers, such augers may not be completely horizontal or completely vertical. For example, the vertical auger may be angled so as to increase a side reach and/or forward reach of the auger relative to the hopper. Likewise, the horizontal auger may have a slope to it, and may also move with the hopper as the grain cart travels over uneven terrain. The terms denote the general direction in which grain is moved, e.g. horizontal movement to displace grain to a lift auger or vertical movement to lift grain to a discharge height.

Figure 1:
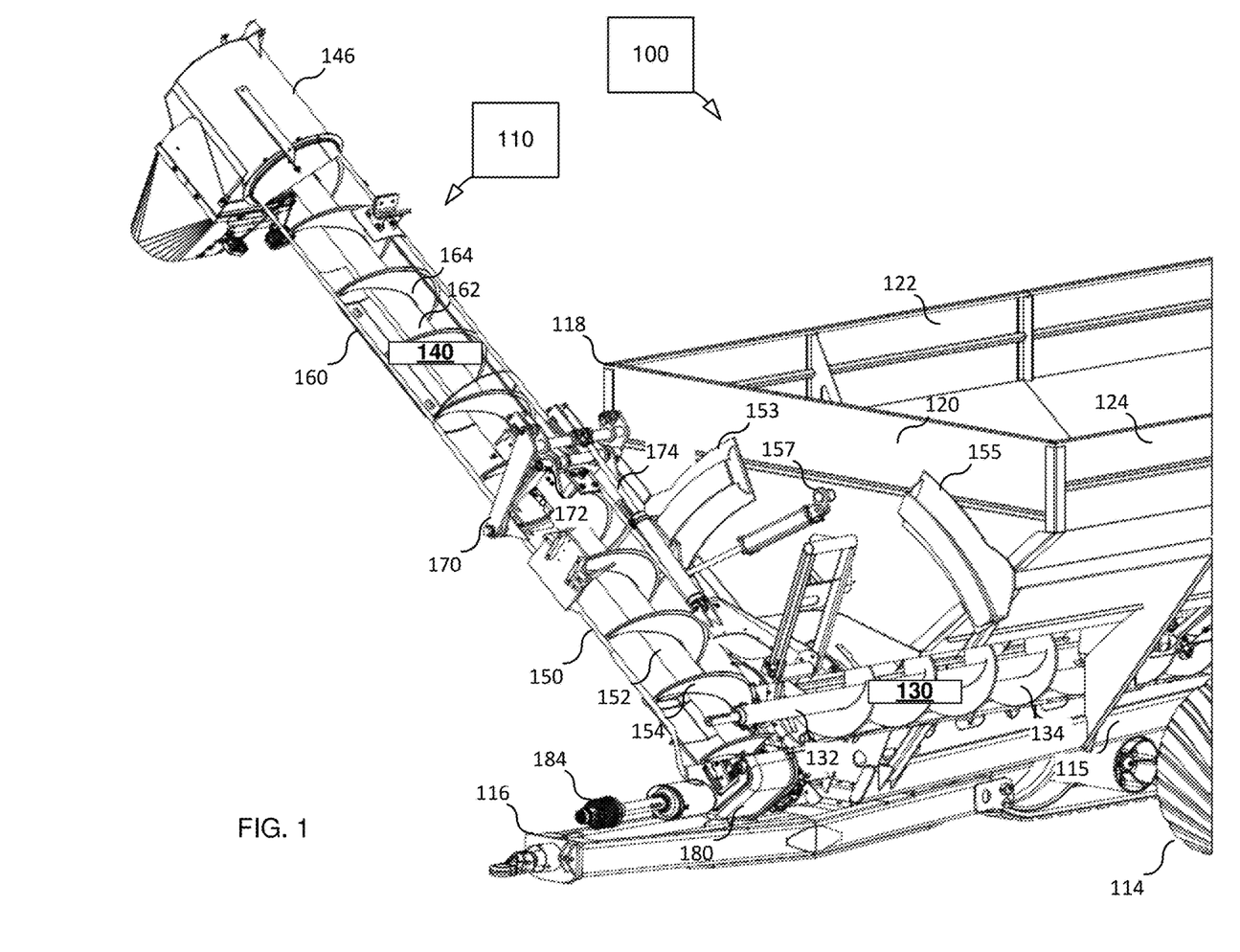
FIG. 1 is a partial perspective view of a grain cart having a dual auger assembly in a right hand configuration with the tubular housing depicted as transparent according to an exemplary embodiment.
Figure 2:
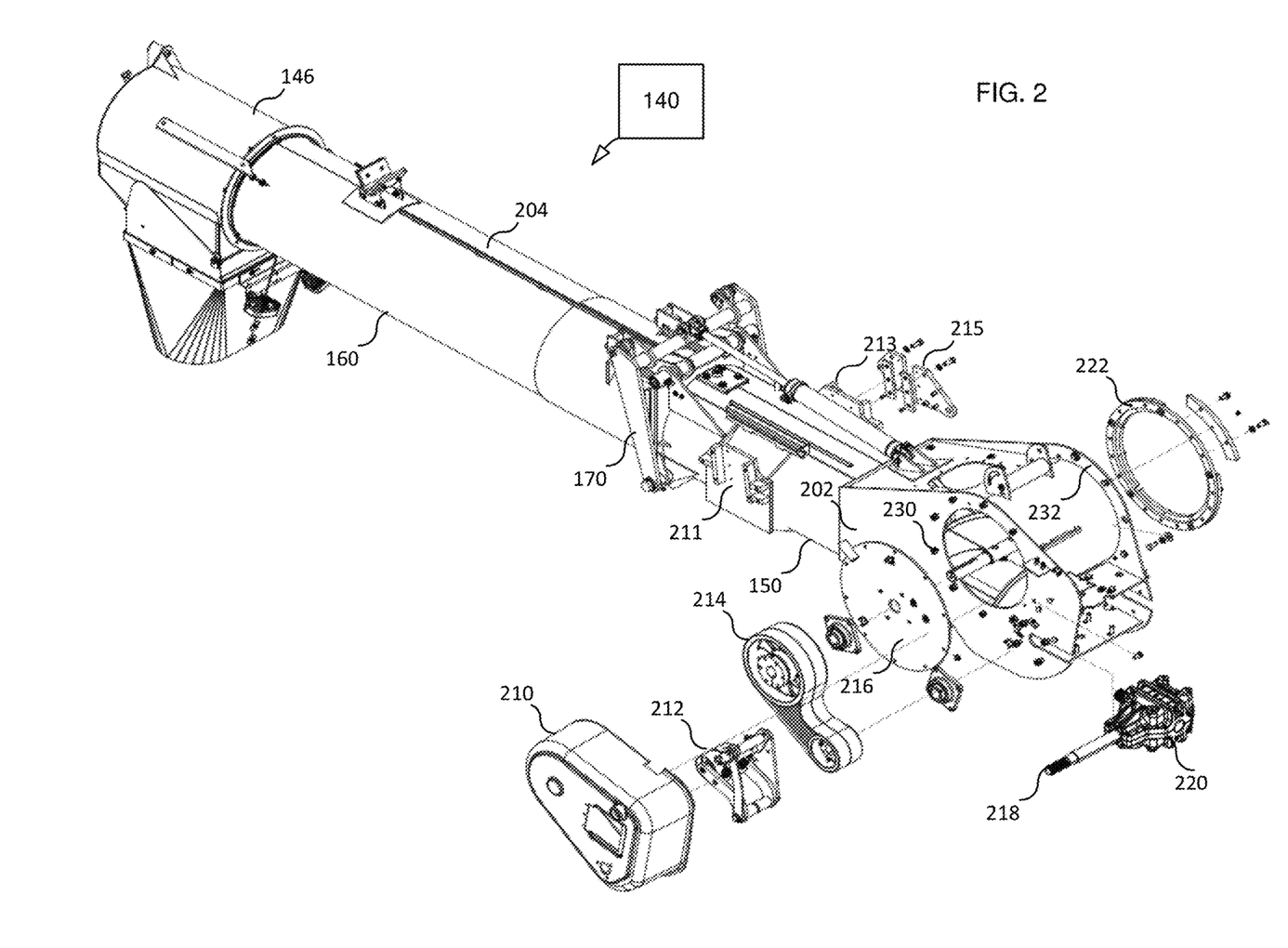
FIG. 2 is a detailed perspective view of the vertical auger assembly in a right hand configuration with the parts shown in an exploded view according to an exemplary embodiment.
Figure 3:
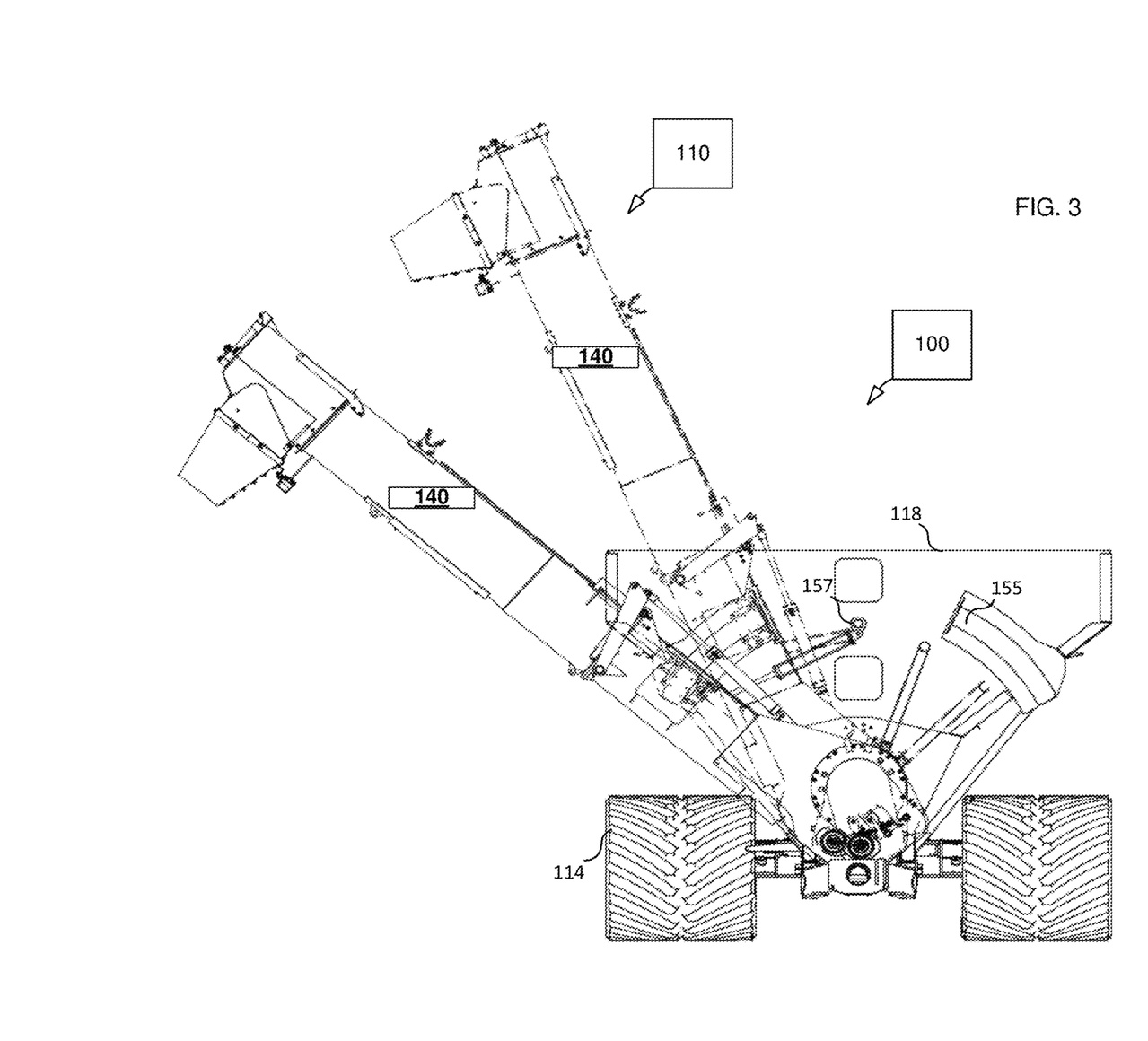
FIG. 3 is a front view of a grain cart having a dual auger assembly in a right hand configuration according to an exemplary embodiment.
Figure 4:
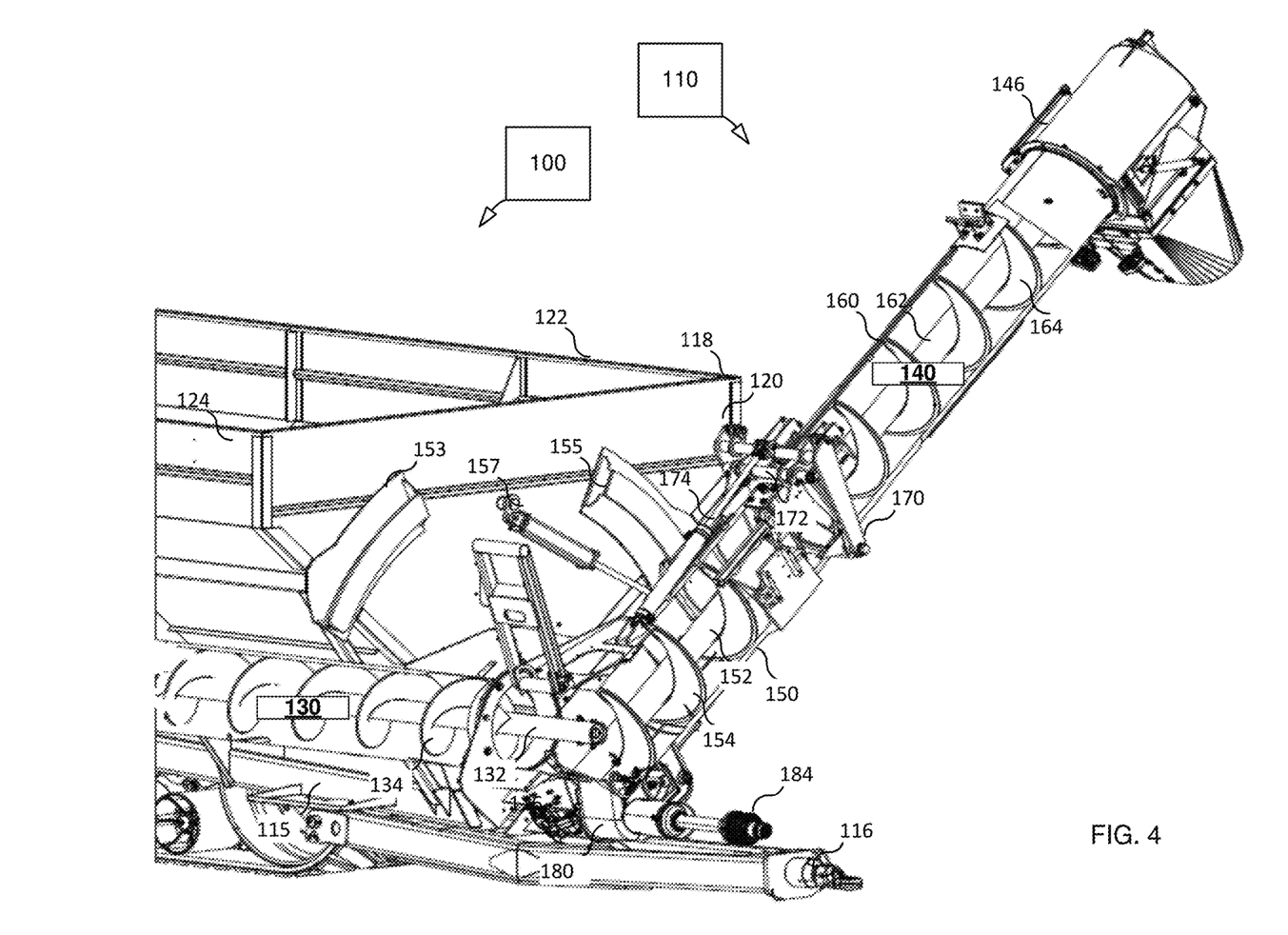
FIG. 4 is a partial perspective view of a grain cart having a dual auger assembly in a left hand configuration with the tubular housing depicted as transparent according to an exemplary embodiment.
Figure 5:
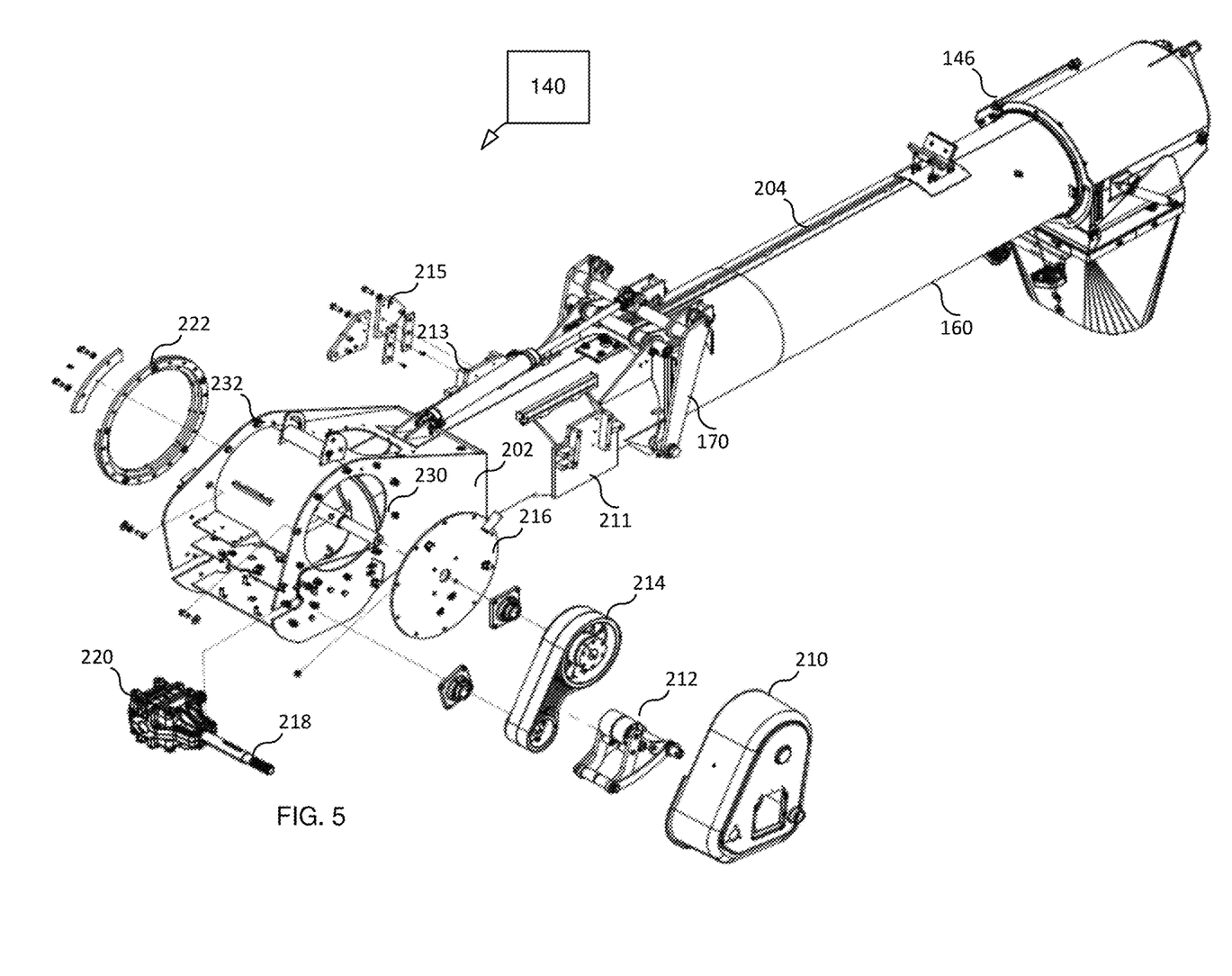
FIG. 5 is a detailed perspective view of the vertical auger assembly in a left hand configuration with the parts shown in an exploded view according to an exemplary embodiment.
Figure 6:
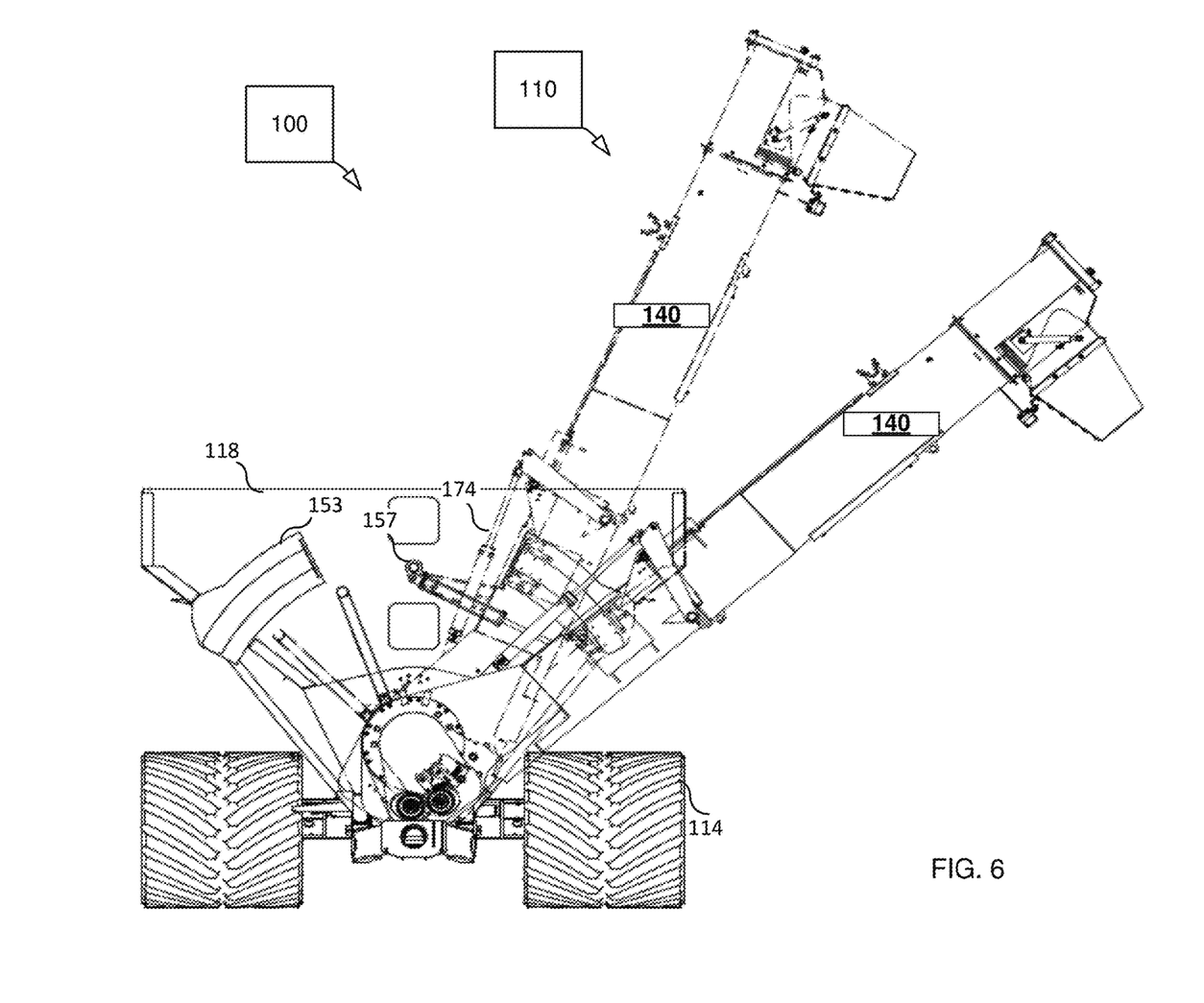
FIG. 6 is a front view of a grain cart having a dual auger assembly in a left hand configuration according to an exemplary embodiment.

FIGS. 1-6 depict an exemplary grain cart 100 with a dual auger assembly 110 according to an embodiment of the present disclosure. As shown in FIGS. 1-3, the vertical auger assembly 140 is an a RH unload configuration, and as shown in FIG. 4-6, the vertical auger assembly 140 is in a LH unload configuration. Like part numbers refer to the same or similar parts in the figures. An embodiment is described below with respect to FIGS. 1-6.

As shown, the grain cart includes a grain holding container or hopper 118 mounted on a frame 115 with tracks 114 for moving the grain cart 100 and a hitch 116 for coupling the grain cart 100 to a vehicle (such as a tractor). In some embodiments, the grain cart may include wheels instead of (or in addition to) tracks 114. The hopper 118 includes a front wall or side 120, laterally opposed side walls 122 and 124, and a rear wall or side (not shown), which together define a grain holding space with a bottom, and which may have an open top. In some embodiments, as shown in FIG. 1, the opposed side walls 122 and 124 of the hopper 118 are angled toward each other to form a trough that extends along a bottom of the hopper 118 to promote grain flow toward the bottom of the hopper 118. In some embodiments the walls may be curved, or sloped differently than shown, in order to promote grain flow toward the bottom of the hopper 118.

The dual auger assembly 110 includes a horizontal auger assembly 130 disposed toward a bottom of or below the hopper 118 and extending substantially along the trough of the hopper 118 so as to receive grain flow falling or flowing toward the bottom of the hopper 118. In some embodiments, the horizontal auger assembly 130 may extend along a substantial portion of the length of the hopper 118, up to and including the entire length of the hopper 118. The horizontal auger assembly 130 is configured to convey agricultural material (such as grain) collected at the bottom of the hopper 118 toward a discharge opening disposed at the front wall 120 of the hopper 118. In some embodiments, grain cart 100 may have more or fewer augers than shown.

The horizontal auger assembly 130 may include one or more auger sections. As shown, the horizontal auger assembly 130 includes an auger section having a horizontal auger shaft 132 extending along the trough of the hopper and defining a longitudinal axis of the auger section. The longitudinal axis may also be referred to as a centerline, where the axis extends through the center of the auger section along its length. The horizontal auger shaft 132 has auger flighting 134 and is configured to rotate about the longitudinal axis of the auger section causing the flighting to also rotate. The auger flighting 134 may be disposed along and project in a radial direction from the horizontal auger shaft 132. In some embodiments, auger flighting 134 may be a helical flighting wrapped or positioned around, and connected to the horizontal auger shaft 132. The horizontal auger shaft 132 extends through the discharge opening of the hopper 118. The horizontal auger shaft 132 includes an end disposed proximate to the discharge opening. The horizontal auger assembly 130 is shown in FIG. 1 for illustrative purposes with the auger shaft and flighting exposed. In some embodiments, the auger shaft and flighting is covered and/or concealed by an auger housing; the auger shaft and flighting may also be covered and/or concealed by one or more of frame 115 and walls or siding of hopper 118. Where an auger housing is used for one or more auger sections of the horizontal auger assembly 130, the housing may include an opening (e.g. an opening on an upper side of the housing) for receiving grain from the hopper 118 and/or trough.

The exemplary dual auger assembly 110 shown also includes a substantially vertical auger assembly 140 located at a front the grain cart 100. In some embodiments, the vertical auger assembly 140 may be located at a rear, or on another side of the grain cart 100, including at or near a corner of the grain cart 100. The dual auger assembly 110 includes an intake housing (such as intake housing 202 shown in FIG. 2) positioned proximate to the discharge opening to receive agricultural material from the bottom of the hopper (via horizontal auger assembly 130). The intake housing defines a junction or transition zone, where agricultural material is received from the horizontal auger assembly 130 and redirected to the vertical auger assembly 140. The intake housing may comprise a back wall facing the front wall 120 of the hopper 118 and an inlet disposed along the back wall to receive agricultural material conveyed from the horizontal auger assembly 130. The intake housing may comprise a top wall projecting from the back wall and an outlet disposed along the top wall to discharge agricultural material out of the intake housing and into the vertical auger assembly 140. In some embodiments, the intake housing is substantially symmetrical about a longitudinal axis extending through the outlet.

The vertical auger assembly 140 may include a discharge portion 146 laterally and forwardly spaced from the hopper 118. As shown, the discharge portion 146 is a spout rotatably coupled to an upper auger housing (such as upper auger housing 204 shown in FIG. 2). In some embodiments, the discharge portion 146 includes a rotating actuator (not shown) (e.g., hydraulic motor with gears or a hydraulic cylinder) configured to rotate the discharge portion 146 to one or more angular positions. The vertical auger assembly 140 extends upwardly from the intake housing to the discharge portion 146. In some embodiments, the discharge opening opens into the intake housing such that the vertical auger assembly 140 is in communication with the horizontal auger assembly 130. The vertical auger assembly 140 is configured to receive agricultural material discharged from the horizontal auger assembly 130 at the intake housing and convey agricultural material to the discharge portion 146 to facilitate discharge of the agricultural material into another container such as, for instance, another grain cart, semi-trailer, or rail car located to the side or in the vicinity of the grain cart 100.

The vertical auger assembly 140 may include one or more auger sections. As shown, the vertical auger assembly 140 includes a lower auger section 150 and an upper auger section 160. Folding joint assembly 170 connects the lower auger section 150 to the upper auger section 160. Folding joint assembly 170 is configured to connect the lower auger section 150 with the upper auger section 160 such that the upper auger section 160 may be moved between an operating position extending laterally outward from the forward corner of the hopper 118 and a transport position folded diagonally across the front wall 120 of the hopper 118, such as one of the auger assemblies described in U.S. Pat. No. 9,039,340, entitled "Grain Cart with Folding Auger"; the entire contents of which are herein incorporated by reference. In some embodiments, when the upper auger section 160 is in the operating position, it additionally extends forwardly outward from the forward corner of the hopper 118. In some embodiments, the folding joint assembly 170 may include a hinge 172 that pivotably connects the upper auger section 160 to the lower auger section 150 and a folding actuator 174 (e.g., hydraulic cylinder) comprising a rod that is configured to contract and expand to move the upper auger section 160 between the operating position and the transport position. While two auger sections are shown for the vertical auger assembly 140, embodiments may include more auger sections or fewer auger sections, including a single auger section. Additionally, while folding joint assembly 170 is shown as connecting upper auger section 160 and lower auger section 150, other joint assemblies or couplings may be used to connect or join different auger sections together. For example, a universal joint may be used to connect two auger sections together, such as where the two auger sections are angled with respect to each other and the universal joint allows the transfer of rotational force through an angle. Components of an auger assembly, such joint assemblies or couplings, that may be used in embodiments described herein are disclosed in U.S. application Ser. No. 16/561,894, entitled "Farm implement with folding auger," the entire contents of which are herein incorporated by reference.

As shown, the lower auger section 150 extends from intake housing near the bottom of hopper 118 to a front corner of the hopper 118 where the one of the laterally opposed side walls 122 or 124 intersects front wall 120. In some embodiments, the lower auger section 150 extends from the intake housing to a point proximally adjacent to a front corner, immediately adjacent to a front corner, or disposed at or substantially at a front corner of the hopper 118. The vertical auger assembly 140 is capable in some embodiments of moving or pivoting substantially in a plane parallel to the front wall 120. In such embodiments, the position of the lower auger section 150 may change as the vertical auger assembly 140 is moved or pivoted.

The lower auger section 150 includes a tubular-shaped lower housing extending from the intake housing and a lower auger shaft disposed within the lower housing. The lower auger shaft defines a longitudinal axis of the lower auger section 150. The longitudinal axis may also be referred to as a centerline, where the axis extends through the center of the lower auger section 150 along its length. The lower auger shaft has a lower auger flighting 154 and is configured to rotate about the longitudinal axis of the lower auger section 150 causing the flighting to also rotate. The lower auger flighting 154 may be disposed along and projecting in a radial direction from the lower auger shaft 152. In some embodiments, the lower auger flighting 154 may be a helical flighting wrapped or positioned around, and connected to, the lower auger shaft 152. The lower auger shaft 152 includes an end disposed in the intake housing and another end laterally spaced from the hopper 118. In embodiments, the end laterally spaced from the hopper 118 may additionally be forwardly spaced from the hopper 118.

The upper auger section 160 extends from the lower auger section 150 to the discharge portion 146. The upper auger section 160 comprises a tubular-shaped upper housing and an upper auger shaft 162 disposed within the upper housing. The upper auger shaft 162 defines a longitudinal axis of the upper auger section 160. The longitudinal axis may also be referred to as a centerline, where the axis extends through the center of the upper auger section 160 along its length. As illustrated, lower and upper auger sections 150 and 160 are in-line with each other, meaning that they share a longitudinal axis (when in an operating, non-folded position). In some embodiments, lower and upper auger sections 150 and 160 may be out-of-line with each other, meaning that they have different, non-parallel longitudinal axes. The upper auger shaft 162 has an upper auger flighting 164 and is configured to rotate about the longitudinal axis of the upper auger section 160 causing the flighting to also rotate. The upper auger flighting 164 may be disposed along and projecting in a radial direction from the upper auger shaft 162. In some embodiments, the upper auger flighting 164 may be a helical flighting wrapped or positioned around, and connected to, the upper auger shaft 162. In some embodiments, the upper auger shaft 162 includes an intake end configured to operatively connect to the discharge end of the lower auger shaft 152 and a discharge end disposed proximate to or in the discharge portion 146. The vertical auger assembly 140 is shown in FIG. 1 for illustrative purposes with the auger shaft and flighting exposed. In some embodiments, the auger shaft and flighting is covered and/or concealed by an auger housing, such as lower auger housing and upper auger housing.

The dual auger assembly 110 further includes a drive assembly 180. In embodiments, the drive assembly 180 is disposed in or around the intake housing at the front of the grain cart 100. The drive assembly 180 is operatively connected to a power input device 184, which in some embodiments may be an input shaft configured to be driven by a power take off (PTO) shaft of a vehicle towing the grain cart 100. The drive assembly 180 is also operatively connected to the horizontal auger shaft 132 of the horizontal auger assembly 130, and the lower auger shaft 152 of the vertical auger assembly 140. The drive assembly 180 is configured to transmit torque (e.g., rotation) applied by the power input device 184 to both the horizontal auger shaft 132 and the lower auger shaft 152, such that the drive assembly 180 drives rotation of these auger shafts.

The power input device 184 may be releasably connected to the PTO shaft of a vehicle towing the grain cart 100 and is configured to transmit torque applied by the PTO to other components of the drive assembly 180. The drive assembly may also include a casing disposed in or near the intake housing and enclosing all or part of the power input device 184.

In some embodiments, the vertical auger assembly 140 is offset from the horizontal auger assembly 130, such that a centerline of the horizontal auger assembly 130 is above a centerline of the vertical auger assembly 140. For example, this configuration is shown in FIG. 1, where the horizontal auger shaft 132 is located above part of the upper auger shaft 162. As shown, part of the upper auger flighting 164 is below the horizontal auger shaft 132.

FIG. 2 shows an exploded view of the parts of the vertical auger assembly 140 that are located in or around the intake housing 202. When changing from a LH unload to a RH unload configuration, or vice versa, these parts are disassembled and reassembled, and are therefore designed to support both the LH unload and RH unload configurations.

Belt cover 210 accommodates the tensioning assembly 212 and belt assembly 214. Tensioning assembly 212 keeps the belts in tension, and belt assembly 214 drives the horizontal auger. Bolt-on cover plate 216 is used to mount the tensioning assembly 212 and belt assembly 214 to the intake housing 202. Gear assembly 220 having a shaft 218 is also housed within the intake housing 202 as shown. Auger pivot mount plate 222 (also referred to as a pivot ring) is bolted on to the lower auger housing and is used to pivotally mount the lower auger housing to the frame 115.

In embodiments, a centerline of the horizontal auger assembly 130 is located above part of the vertical auger assembly 140 in both the LH and RH unload configurations (compare FIGS. 1-3 (RH) and FIGS. 4-6 (LH)). This design allows for similar transition between the horizontal auger assembly 130 and vertical auger assembly 140 and unloading characteristics for both the LH and RH unload configurations. Since the dual auger assembly 110 utilizes the same gearbox 220 and vertical auger flighting weldment for both LH and RH unload configurations, the rotation of the vertical auger assembly 140 relative to the horizontal auger assembly 130 is opposite when comparing the LH unload and RH unload configurations. This relation of the centerline of the horizontal auger assembly 130 being located above part of the vertical auger assembly 140 can be maintained for LH unload and RH unload configurations, for example, if the gearbox and vertical auger flighting weldment are different, opposite rotation, for the LH unload configuration and the RH unload configuration.

In embodiments, the vertical auger hinge 172 remains above the vertical auger segments in both the LH and RH unload configurations. The hinge 172 being above the vertical auger segments can be advantageous as it helps keep the hinge 172 between upper and lower auger segments shut. With the hinge 172 on the bottom side of the vertical auger segments, it can present some challenges over the hinge 172 being above the vertical auger segments. Such challenges include a need for higher pressure in the upper auger fold cylinder to move the upper auger portion as well as keep a tight seal to prevent grain from leaking. Alternately, the hinge 172 may be on the back or rearward side, between the vertical auger assembly 140 and the hopper front panel 120. The implications of a rearward hinge are (1) that it may cause the upper auger segment to fold rearward when in one unload side and forward in the opposite unload side; and (2) if the hinge always folded to the rear in both LH and RH unloading positions, it may need upper auger storage location along both sides of the hopper.

The junction box weldment is designed to allow for the usage of the same belt tensioner assembly 212 and related horizontal drive system components for both the LH unload and RH unload configurations. Both the front 230 and rear 232 junction box plates include a main opening for the inlet of the horizontal auger assembly 130. The front 230 and rear 232 junction box plates also include mounting holes for the auger pivot mount plate 222, bolt-on cover plate 216, and all of the required driveline components. The front 230 and rear 232 junction box plate profiles are designed to allow for the usage of the same belt cover 210 and belt tensioner 212 for both LH and RH unload configuration. As shown, this auger pivot mount plate 222 allows the vertical auger assembly 140 to pivot about the horizontal auger centerline; it includes mounting holes that match up to a ring on the front of the hopper discharge extension. If the vertical auger assembly 140 did not pivot, the ring on the hopper discharge extension would only need mounting holes in that ring that match up to the junction box rear plate 232, in which case the auger pivot plate 222 as shown is not needed.

The auger pivot mount plate 222 is bolted to the backside 232 of the auger junction box. On the front side 230 of the junction box the main opening is covered by a bolt-on cover plate 216. The same mounting holes are used on both the auger pivot mount plate 222 and the bolt-on cover plate 216. The belt tensioner 212 mounting location for both LH auger output and RH auger output place the belt tensioner 212 on the loose side for the belts relative the drive and driven pulleys. Here, the "loose side" is determined by the PTO rotation; the tensioner may also be placed on the tight side. With this design, the belt tensioner 212 is located below the belt and pulleys when in the LH auger output configuration and the belt tensioner is located above the belt and pulleys when in the RH auger output configuration.

The front panel of the grain cart hopper includes two auger slide plate weldments—a RH slide plate weldment (or slide rail) 153 and a LH slide plate weldment (or slide rail) 155—to allow for the ability to have both LH and RH auger output configurations. The slide plate weldments are positioned symmetrically about the centerline of the cart relative to each other. Alternatively, there may be one slide rail that is removably mounted in either a LH or RH position. The auger tilt cylinder lug 157 is located on the front hopper panel and positioned so that the same cylinder lugs are used for both LH unload and RH unload while achieving the same auger range of motion for both LH and RH unload configurations. The vertical auger weldment also has two auger slide mount weldments 211, 213 positioned symmetrically about the vertical auger axis relative to each other. Alternatively, the slide mount weldments may be fastened to the vertical auger assembly 140, being flipped to the opposite side when moved from a LH or RH unload configuration.

To reconfigure a cart 100 from LH unload to RH unload, or vice versa, the vertical auger assembly 140 has to be removed from the cart 100. In the process of removing the vertical auger assembly 140, the belt cover 210 and at least part of the belt assembly 214 may be removed from the front of the vertical auger assembly 140. The part of the belt assembly 214 removed may include the belts and the upper pulley/sheave connected to the horizontal auger shaft 132. Once the vertical auger assembly 140 is removed from the cart, the drive system components (gearbox 220, bearings, tensioning assembly 212, etc.) can be removed. The next step is to remove the auger tilt cylinder lug and guide pads 215, bolt-on pivot ring 222, as well as the bolt-on cover plate 216 from the junction box. The pivot ring 222, bolt-on cover plate 216, tilt cylinder lug and guide pads 215 can be reinstalled on the auger assembly on the opposite sides of the junction box. The drive system components and the rest of the components removed in earlier steps can then be reinstalled on the corresponding side of the junction box and vertical auger assembly 140. Once the vertical auger assembly 240 is placed back on the hopper, it is in the opposite side unload position.

The presented auger design orients the vertical auger assembly 140 about 90 degrees relative to the horizontal auger, which places the vertical auger perpendicular to the side of the cart hopper. With changes to the bolt on auger pivot mount plate as well as designing a different mounting weldment for the belt tensioner and related driveline components (gearbox, belt tensioner cover, etc.) there is the ability to create a forward leaning vertical auger assembly that has the capability of being configured in either a LH or RH unload configuration such as shown in U.S. patent application Ser. No. 16/561,894. Other components that would have to be potentially redesigned to achieve a forward leaning vertical auger are the location and design of the auger slide weldments both on the vertical auger and on the front of the hopper as well as the location of the tilt cylinder and related cylinder lugs. Some aspects of a forward leaning auger assembly that would have to be considered are the vertical auger output location relative the hitch of the cart, auger clearance with the tractor that is towing the cart and other spatial limitations that a forward leaning auger presents. other challenges include at least that what is forward on one unload side would make for a rearward direction on the opposite unload side. This may also potentially cause collision with or otherwise interfere with the hopper.

For example, if the lower vertical auger section 150 is angled away from the hopper front wall 120, some type of wedges bolted to or welded to the front junction box 230 and rear junction box plate may be used. For an angle between lower vertical section 150 and upper vertical section 160, the upper of the lower auger section 150 may have a portion that spins or flips to change or flip the angle direction. A folding joint assembly may have to accommodate this as well. Additionally, or alternatively, a bolt ring may be used at the top of the junction box for the lower auger section 150 so as to allow it to rotate by e.g., 180°, to change the offset direction. Related features are disclosed in U.S. Pat. No. 10,426,092, entitled "Dual auger grain cart with adjustable forward reach," and U.S. Pat. No. 11,019,771, entitled "Convertible dual-sided auger system for a farm implement," and both are hereby incorporated by reference in their entirety.

In some embodiments, grain cart 100 may include a slide assembly, including a RH slide rail 153 and LH slide rail 155, that couples the vertical auger assembly 140 to the front wall 120 of the hopper 118. The slide assembly is configured to allow the vertical auger assembly 140 to move or pivot substantially in a plane parallel to the front wall 120. That is, the vertical auger assembly 140 may move or pivot in the left-or-right directions with respect to the front wall 120 of the hopper 118. When doing so, as shown in FIG. 3 (for the RH configuration) and FIG. 6 (for the LH configuration), the vertical auger assembly 140 may move between one or more operating positions along an unloading range. The two vertical auger assemblies 140 shown in FIGS. 3 and 6 represent different positions of the single vertical auger assembly 140 at different times along the unloading range as the vertical auger assembly 140 pivots. Alternately, if the vertical auger assembly 140 does not pivot and is instead a fixed vertical auger assembly, the slide rails 153 and 155 and auger slide weldments 211 and 213 may be replaced with fixed position mounting weldments. In this scenario, the auger tilt cylinder, auger tilt cylinder lug 157, and guide pads 215 are unnecessary and may be eliminated.

Dual auger grain carts are described in in U.S. Pat. No. 10,426,092, entitled "Dual Auger Grain Cart with adjustable forward reach", the content of which are herein incorporated in their entirety. The disclosures therein related to dual auger grain carts, and specifically to horizontal and vertical augers, are applicable to grain carts of embodiments herein described.

Track propulsion systems for grain carts are described in U.S. Pat. No. 9,457,854, entitled "Track Assembly for Farm Implement," the contents of which are herein incorporated in their entirety. The disclosures therein related to propulsion systems, are applicable to grain carts of embodiments herein described.

Folding augers for grain carts are described in U.S. Pat. No. 9,216,681, entitled "Grain Cart with Folding Auger," the contents of which are herein incorporated in their entirety. The disclosures therein related to folding augers, are applicable to grain carts of embodiments herein described.

Controls for automating unloading of a farm implement are described in U.S. Pat. No. 9,185,845, entitled "Method for controlling unload of a mobile farm implement"; U.S. Pat. No. 9,596,805, entitled "Method for controlling unload of a mobile farm implement"; and U.S. Pat. No. 10,028,434, entitled "Method for controlling upload of a mobile farm implement." The contents of these applications are herein incorporated in their entirety. The disclosures therein related to the control devices and automated control of farm implements, are applicable to the grain carts of embodiments herein described.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A farm implement comprising:
a frame;
a container mounted on the frame and configured to hold agricultural material, the container comprising a plurality of walls defining a container opening to receive agricultural material, and the plurality of walls including a front wall comprising a discharge opening to discharge agricultural material out of the container;
a first auger assembly disposed in the container and comprising a first auger shaft configured to rotate about a longitudinal axis thereof to move agricultural material received from the container opening toward the discharge opening;
an intake housing connected to the front wall proximate to the discharge opening, the intake housing comprising an inlet in communication with the discharge opening to receive agricultural material conveyed from the first auger assembly and an outlet to discharge agricultural material out of the intake housing; and
a second auger assembly coupled to the outlet of the intake housing, the second auger assembly comprising an inlet at a first end to receive agricultural material from the outlet of the intake housing, an outlet at a second end to discharge agricultural material, and a second auger shaft configured to rotate about a longitudinal axis thereof to move agricultural material received from the inlet of the second auger assembly toward the outlet of the second auger assembly;
wherein the second auger assembly is mounted in one of a first mounting configuration and a second mounting configuration, and is configured to be mountable in the other of the first mounting configuration and the second mounting configuration;
wherein, in the first mounting configuration, the second auger assembly is configured to discharge agricultural material at about a first side of the container when in a first operating position, and in the second mounting configuration, the second auger assembly is configured to discharge agricultural material at about a second side of the container opposite the first side of the container when in a second operating position;
wherein, in each of the first and second operating positions, the longitudinal axis of the first auger shaft is in a substantially different plane than the longitudinal axis of the second auger shaft; and
wherein the longitudinal axis of the first auger shaft is above a part of the second auger shaft in both of the first and second mounting configurations.

2. The farm implement of claim 1, wherein, in the first mounting configuration, the second auger assembly is configured to pivot with the intake housing to a first plurality of operating positions to discharge agricultural material, the first plurality of operating positions including the first operating position; and wherein, in the second mounting configuration, the second auger assembly is configured to pivot with the intake housing to a second plurality of operating positions to discharge agricultural material, the second plurality of operating positions including the second operating position.

3. The farm implement of claim 2, further including first and second slide rails mounted along the front wall, wherein the first and second slide rails are substantially symmetrical about a centerline of the front wall; and     a rail follower connected to the second auger assembly and received in the first slide rail in the first mounting configuration and received in the second slide rail in the second mounting configuration, and the rail follower is configured to slide along the first or second slide rail as the second auger assembly pivots to at least one of the first or second plurality of operating positions.

4. The farm implement of claim 3, further comprising a slide actuator removably coupled to the rail follower, wherein the slide actuator is configured to move the second auger assembly to the one or more of the first or second plurality of operating positions and wherein the slide actuator is connected to the front wall at the same position in both the first mounting configuration and the second mounting configuration.

5. The farm implement of claim 3, wherein the first and second slide rails are different from each other and do not overlap.

6. The farm implement of claim 1, wherein the longitudinal axis of the first auger shaft is above a part of auger flighting in the second auger shaft in both of the first and second mounting configurations.

7. The farm implement of claim 1, wherein the longitudinal axis of the second auger shaft is orthogonal to the longitudinal axis of the first auger shaft.

8. The farm implement of claim 1, wherein the longitudinal axis of the second auger shaft is angled forwardly with respect to the longitudinal axis of the first auger shaft.

9. The farm implement of claim 1, wherein a first set of mounting parts for mounting the first second auger shaft in the first mounting configuration is identical to a second set of mounting parts for mounting the second auger shaft in the second mounting configuration.

10. The farm implement of claim 1, wherein the intake housing connected to the front wall proximate to the discharge opening is rotatably connected thereto.

\* \* \* \* \*